United States Patent
Royak et al.

(10) Patent No.: US 8,902,616 B2
(45) Date of Patent: Dec. 2, 2014

(54) ACTIVE FRONT END POWER CONVERTER WITH DIAGNOSTIC AND FAILURE PREVENTION USING PEAK DETECTOR WITH DECAY

(75) Inventors: Semyon Royak, Beachwood, OH (US); John M. Kasunich, Mayfield Hts., OH (US); Robert J. Breitzmann, South Russel, OH (US); John James Jenks, Rocky River, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 355 days.

(21) Appl. No.: 13/272,777

(22) Filed: Oct. 13, 2011

(65) Prior Publication Data

US 2013/0094258 A1 Apr. 18, 2013

(51) Int. Cl.
| | |
|---|---|
| *H02M 5/42* | (2006.01) |
| *H02M 7/219* | (2006.01) |
| *H02M 1/32* | (2007.01) |
| *H02M 1/00* | (2006.01) |

(52) U.S. Cl.
CPC ........ *H02M 1/32* (2013.01); *H02M 2001/0022* (2013.01); *H02M 7/219* (2013.01); *Y02B 70/1408* (2013.01)
USPC .................................. 363/51; 363/37; 363/89

(58) Field of Classification Search
USPC ................. 363/34, 35, 36, 37, 44, 48, 50–53, 363/81–94, 125, 127
See application file for complete search history.

(56) References Cited

U.S. PATENT DOCUMENTS

| | | | |
|---|---|---|---|
| 5,719,450 A * | 2/1998 | Vora | 307/116 |
| 5,796,236 A | 8/1998 | Royak | |
| 6,052,297 A | 4/2000 | Akamatsu et al. | |
| 6,084,786 A * | 7/2000 | Rozman | 363/48 |
| 6,636,012 B2 | 10/2003 | Royak et al. | |
| 6,703,809 B2 | 3/2004 | Royak et al. | |
| 6,831,440 B1 | 12/2004 | Royak et al. | |
| 7,106,024 B2 | 9/2006 | Harbaugh et al. | |
| 7,336,509 B2 | 2/2008 | Tallam | |
| 7,355,865 B2 | 4/2008 | Royak et al. | |
| 7,733,677 B2 | 6/2010 | Cheng | |
| 7,751,211 B2 * | 7/2010 | Yuzurihara et al. | 363/127 |
| 7,990,097 B2 * | 8/2011 | Cheng et al. | 318/800 |
| 8,009,450 B2 | 8/2011 | Royak et al. | |
| 8,022,658 B2 * | 9/2011 | Ide | 318/802 |
| 8,044,631 B2 * | 10/2011 | Dai et al. | 318/800 |
| 2003/0198065 A1 * | 10/2003 | Hayashi et al. | 363/35 |
| 2005/0207192 A1 * | 9/2005 | Fu et al. | 363/89 |
| 2006/0034104 A1 | 2/2006 | Royak et al. | |
| 2007/0291426 A1 | 12/2007 | Kasunich et al. | |
| 2008/0094015 A1 | 4/2008 | Royak et al. | |
| 2008/0130335 A1 | 6/2008 | Yuzurihara et al. | |
| 2010/0054004 A1 | 3/2010 | Royak et al. | |

* cited by examiner

*Primary Examiner* — Gary L Laxton
*Assistant Examiner* — Afework Demisse
(74) *Attorney, Agent, or Firm* — Fay Sharpe LLP (57) ABSTRACT

Active front end power conversion systems are presented having a peak detector with adjustable decay providing a signal to an overload protection component to selectively discontinue rectifier switching control signals for protection of active rectifier switches during unbalanced line voltage conditions.

22 Claims, 7 Drawing Sheets

FIG. 11

ACTIVE FRONT END POWER CONVERTER WITH DIAGNOSTIC AND FAILURE PREVENTION USING PEAK DETECTOR WITH DECAY

BACKGROUND

The present invention relates generally to electrical power conversion systems and more particularly to active front end power converters with failure prevention using peak detection with decay. Power conversion systems supply power to a load by conversion of input power to output power of a different form. Active front end power converters include a switching rectifier stage that receives AC input power at a line frequency and converts the AC power to provide a DC bus voltage or DC link current to a load, which may be a subsequent power converter stage. In motor drives, for example, the DC power from the active front end is used by a subsequent inverter to create variable frequency AC output power to drive a motor. In wind energy systems, an active front end receives AC input power provided by a wind turbine generator, and converts this into DC power for use by a subsequent inverter stage that provides energy at a controlled phase and frequency to a power grid. In motor drives and other power converter applications, the IGBTs or other switching devices of the active front end can be damaged or degraded by excessive currents that may result from unbalanced phase voltages stemming from various faults or noise sources present in a power distribution system.

In the past, these problems have been addressed by oversizing the active rectifier switching devices to accommodate source imbalance situations or by operating the converter below rated output to prevent switching component damage or degradation. U.S. Pat. No. 7,355,865 to Royak et al., assigned to Rockwell Automation Technologies, Inc., provides control of second order harmonics in voltage imbalance situations using current regulation in the stationary reference frame, the entirety of which patent is hereby incorporated by reference herein. U.S. Pat. No. 8,009,450 to Royak et al., assigned to Rockwell Automation Technologies, Inc., describes compensating voltage command values for individual phases according to line voltage imbalances to provide balanced phase currents in the presence of unbalanced phase supply line voltages, the entirety of which patent is hereby incorporated by reference herein. Many power conversion systems also include shutdown circuitry for overcurrent protection, which is triggered by detecting a dangerous level of instantaneous peak current, sometimes referred to as an overcurrent level or IOC. In these systems, the trigger level is typically set to a value higher than rated current, such as about 220% of rated current. Certain power distribution fault conditions, however, may involve current levels sufficient to cause thermal stress to IGBTs even though the instantaneous current does not exceed the IOC level. For instance, the RMS value of one or more individual phase currents resulting from some faults in a Grid may be quite large and potentially cause thermal damage to an active rectifier switching device, while the corresponding instantaneous current values remain below the IOC level.

Other fault conditions can be caused by generation of current and voltage spikes on power lines that feed motor drives or other power conversion systems. For instance, welding equipment and other electrical noise sources may be connected to a power system, and thermal of overloading of active front end switching devices may result even if there is no fault in a Grid or resulting phase voltage unbalance condition. Consequently, a need remains for improved power conversion systems and techniques for protecting active front end switching devices against noise and voltage or current imbalance fault conditions.

SUMMARY

Various aspects of the present invention are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

The present disclosure involves fast diagnostic techniques and systems for identifying potentially damaging current levels in an active front end power conversion system using peak detection and decay components which can be advantageously employed alone or in conjunction with IOC detection apparatus to avoid or mitigate thermal overload of active rectifier switching devices in the presence of imbalance fault conditions and/or noise sources in a power distribution system. The disclosed techniques can be successfully employed to provide protection against thermal stress or damage for short-term imbalances and/or power dips that were previously undetected by conventional fault detection techniques that required several fundamental line voltage cycles to calculate RMS values or which required instantaneous current levels in excess of a predetermined IOC level. In particular embodiments, application of a controllable decay to detected peaks in signals indicating RMS current values can facilitate identification of potential thermal overload conditions through overload protection components using inverse time protection curves to quickly discontinue application of gating pulses to rectifier switches prior to switch damage or degradation. These techniques can thus be used to combat conversion system failure in the presence of welding or other electrical noise sources and/or unbalanced power sources.

In accordance with one or more aspects of the disclosure, a power conversion system is provided having an active rectifier with a controller providing rectifier switching control signals for selective conversion of multiphase AC input power to provide DC electrical power to a subsequent inverter stage or other load. A peak detector is provided, which receives one or more input signals or values derived from measured currents or other parameters of the multiphase power input, and the peak detector provides an output signal or value representing a peak value of the input signal/value(s) with a controlled decay. An overload protection component selectively discontinues provision of rectifier switching control signals at least partially according to the output of the peak detector. The peak detector in certain embodiments provides one or more adjustable decay values, and may operate on one or more input signals or values in a stationary reference frame or in a synchronous reference frame.

In certain embodiments, the system includes a stationary-to-synchronous frame conversion component that receives phase current signals or values representing measured stationary frame AC phase currents of the AC input power and provides one or more synchronous frame current signals or values from which an RMS computation component computes at least one RMS value that is provided as the input to the peak detector. The peak detector in certain embodiments compares the RMS value to the previous detector output scaled by a decay value and the new detector output is provided as the present input signal or value when the input is greater than the scaled previous output. In this manner, the output of the peak detector will follow a rising RMS input signal or value to identify increasing peak current levels in the active front end, or will gradually decay according to the decay value even if the present signal or value at the detector input drops off quickly. In situations involving peak phase currents less than a preset IOC value, the output of the peak detector with decay can be applied to an inverse overcurrent protection timetable or other overload protection component to selectively discontinue rectifier gating control signals to thereby mitigate damage to rectifier switching devices.

In certain embodiments, a multiphase peak detector is provided which receives input signals or values representing measured stationary reference frame phase currents of the multiphase AC power input, and the detector output signal or value is provided representing a peak value of the input signals or values with a controlled decay determined according to one or more decay values. In certain implementations, moreover, a computation component divides the peak detector output signal or value by the square root of 2 and provides the resulting signal or value as an input to the overload protection component.

The peak detector in certain embodiments includes a plurality of individual peak detector components, each receiving a corresponding input signal or value and including an adjustable decay value, and the peak detector includes a maximum selector circuit providing the peak detector output signal or value as a maximum one of the output signals or values of the individual peak detector components.

In other embodiments, the multiphase peak detector includes a rectifier receiving a plurality of inputs representing the measured stationary frame phase currents, and the peak detector provides an output signal or value representing a peak value of the rectifier output signal or value with a controlled decay to the overload protection component.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Referring now to the figures, several embodiments or implementations of the present invention are hereinafter described in conjunction with the drawings, wherein like reference numerals are used to refer to like elements throughout, and wherein the various features are not necessarily drawn to scale.

Figure 1:
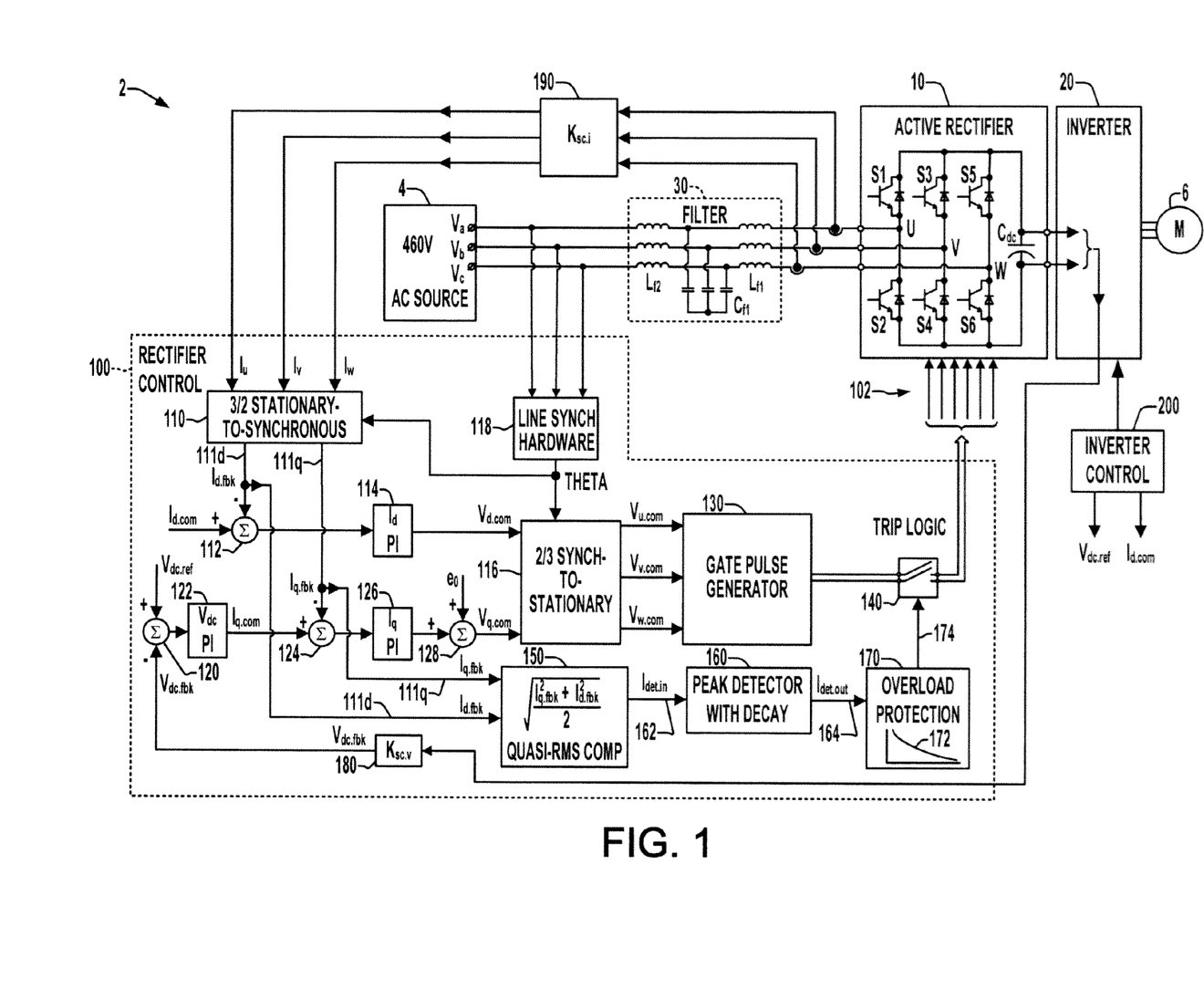
FIG. 1 is a schematic diagram illustrating an exemplary power conversion system with overload protection using a peak detector with decay in accordance with one or more aspects of the present disclosure.

Referring initially to FIG. 1, an exemplary motor drive power conversion system 2 is illustrated, including an active front end (AFE) receiving multiphase (e.g., three-phase) AC electrical input power from a power source 4. The active front end includes a switching (active) rectifier 10 with an AC input including three input terminals (U, V, and W) to receive three-phase AC electrical input power from the source 4, as well as a DC output having first and second output terminals for providing DC output power to a load, such as a subsequent inverter stage 20 operated by an inverter controller 200 used to drive a motor load 6. Although illustrated in the context of a motor drive converter 2, the disclosed concepts and systems may be employed for protecting the switching devices S1-S6 in other types of power conversion systems. In the illustrated system 2, the active rectifier 10 is operated by rectifier switching control signals 102 from a rectifier controller 100. The rectifier controller 100 provides the switching control signals 102 which in turn are coupled to gates of IGBT type switching devices S1-S6 of the rectifier 10, wherein other forms of rectifier switching devices can be used having appropriate control terminals operated according to the switching control signals 102 (e.g., semiconductor-based switches such as silicon controlled rectifiers (SCRs), gate turn-off thyristors (GTOs), gate commutated thyristors (GCTs such as integrated gate commutated thyristors (IGCTs) or symmetrical gate commutated thyristors (SGCTs)), etc.). The system 2 may further include one or more filter circuits 30 coupled between the AC power source 4 in the input terminals of the active rectifier 10, where the illustrated example includes an LCL three-phase filter 30 with individual phases including series connected line filter inductors $L_{f1}$ and $L_{f2}$ with a filter capacitor $C_{f1}$ coupled between the phase line and a neutral node.

In operation, the switching control signals 102 are provided by the controller 100 according to any suitable form of pulse width modulation (PWM) scheme (e.g., space vector modulation (SVM), selective harmonic elimination (SHE), etc.) to cause the individual switching devices S1-S6 to selectively couple a corresponding one of the AC input terminals U, V, and W with a corresponding one of the DC output terminals to create a DC output bus voltage or a regulated DC link current according to the needs of the load or subsequent converter stage. In certain embodiments, the inverter controller 200 may provide one or more setpoint values used by the rectifier controller 100, such as a DC voltage reference signal or value $V_{dc.ref}$ and/or a DC current reference signal value $I_{d.com}$ used to adjust a DC voltage across an output capacitor $C_{dc}$ and/or a DC link current regulated by the active rectifier 10.

The system 2 also includes various feedback components including sensors to monitor are otherwise measure, estimate or ascertain the phase currents in the rectifier input lines U, V and W, which are then scaled by a constant value $K_{sc.i}$ 190 and provided as feedback input signals and/or values $I_U$, $I_V$ and $I_W$ to the rectifier controller 100. In addition, the rectifier controller 100 also receives signals and/or values indicating measured voltages and/or currents provided by the AC power source 4 (before the filter 30), as well as a measured DC output voltage feedback signal that is scaled by a voltage scaling factor constant $K_{sc.v}$ 180 to provide a signal or value $V_{dc.fbk}$. The rectifier controller 100 and/or the inverter controller 200 may include any form of PWM switching signal generation apparatus, where the illustrated rectifier controller 100 includes a gate pulse generator 130 which may provide direct digital pulse width modulation controls that compare carrier waveform values (or signals) with modulating waveform values using processor-executed software, processor-executed firmware, hardware, logic, and/or combinations thereof, and/or carrier-based PWM components with on-board carrier-wave generators and corresponding comparator circuitry (not shown).

The exemplary rectifier controller 100 may be implemented as any suitable hardware/processor-executed software, processor-executed firmware, logic, and/or combinations thereof wherein the illustrated embodiment can be implemented largely in processor-executed software or firmware providing various control functions by which the controller 100 receives feedback and/or input (e.g., setpoint) signals and/or values and provides the switching control signals 102 to operate the switching devices S1-S6 of the active rectifier 10. The controller 100 in FIG. 1 includes a 3-to-2 stationary reference frame-to-synchronous reference frame converter 110 that receives the phase current signals and/or values $I_U$, $I_V$ and $I_W$ and converts these three-phase stationary frame values into "d-axis" and "q-axis" synchronous frame current feedback values $i_{d.fbk}$ and $i_{q.fbk}$, respectively representing reactive and active current components in the two-dimensional synchronous reference frame. In addition, the controller 100 includes line synchronization hardware 118 that receives the measured voltage and/or current values corresponding to the power delivered by the AC source 4 and provides an angle output (THETA) used by the 3-to-2 converter 110 and also by a 2-to-3 synchronous-to-stationary converter 116. The inputs and internal parameters used in, and generated by, the controller 100 may be electrical, RF, and/or optical "signals" and/or may be numeric values provided by corresponding messaging or data exchange/transfer techniques, and which may be optionally stored as program variables in an electronic memory within the controller 100 (not shown), and the various components of the controller 100 may be implemented in processor-executed software, hardware, logic, etc., and/or combinations thereof, where the power conversion system 2 generally, and the controller 100 thereof, may include one or more processing elements such as microprocessors, microcontrollers, programmable logic, etc. As are known (not shown).

The controller 100 performs closed loop control of the DC output of the active rectifier 10 based on one or more setpoint or command values related to the DC voltage and/or current at the rectifier output (e.g., DC voltage reference signal or value $V_{dc.ref}$ and/or DC current reference signal or value $I_{d.com}$), which may be provided by the inverter controller 200 in certain implementations. The DC voltage feedback signal or value $V_{dc.fbk}$ is subtracted from the DC voltage reference setpoint signal or value $V_{dc.ref}$ by a summing component 120 and the difference or error signal output of the summer 120 is provided as an input to a DC voltage proportional/integral (e.g., PI) regulator component 122, which in turn provides a q-axis current setpoint or command value $i_{q.com}$. The q-axis current command value $i_{q.com}$ is then provided to a summing component 124 which subtracts the q-axis current feedback value $i_{q.fbk}$ from the 3-to-2 converter 110 to provide an error or difference input to a q-axis PI regulator 126. The q-axis regulator 126, in turn, provides an output to a summer 128 for summation with an error term $e_0$ to provide a q-axis voltage command signal $V_{q.com}$ as an input signal to the 2-to-3 synchronous-to-stationary reference converter 116. To generate the d-axis voltage command for the converter 116, the controller 100 includes a summer 112 that subtracts the d-axis current feedback value $i_{d.fbk}$ from the d-axis current command value $i_{d.com}$ to provide an error or difference signal as an input to a d-axis current regulator component 114. The regulator 114 provides the d-axis voltage command signal or value $V_{d.com}$ as an input to the synchronous-to-stationary reference converter 116. The converter 116 performs two-dimensional synchronous reference frame-to-three dimensional stationary frame conversion operations to generate three-phase voltage command signals or values $V_{u.com}$, $V_{v.com}$ and $V_{w.com}$ as inputs to the gate pulse generator 130. The pulse generator 130, in turn, generates PWM gate control signals 102 for driving the control terminals of the switching devices S1-S6 of the active rectifier 10 according to any suitable pulse width modulation control scheme.

For protecting the converter 2 in general, and the rectifier switches S1-S6 in particular, the power conversion system 2 also provides trip logic 140 which is operable according to an input control signal or value 174 to switch between a first state (normal mode) in which the PWM gate pulse signals are provided from the pulse generator 130 as rectifier switching control signals 102 to the switches S1-S6 of the active rectifier 10, and a second state (protection mode) in which the outputs of the pulse generator 130 are not provided to the rectifier switches S1-S6, and thus, the rectifier switches S1-S6 in the protection mode do not couple the AC input power to the DC output terminals. The control signal or value 174 is provided to the trip logic 140 by an overload protection component 170 based at least partially on a signal or value $i_{det.out}$ 164, which may be characterized as a percentage of rated converter current in certain embodiments.

Figure 3:
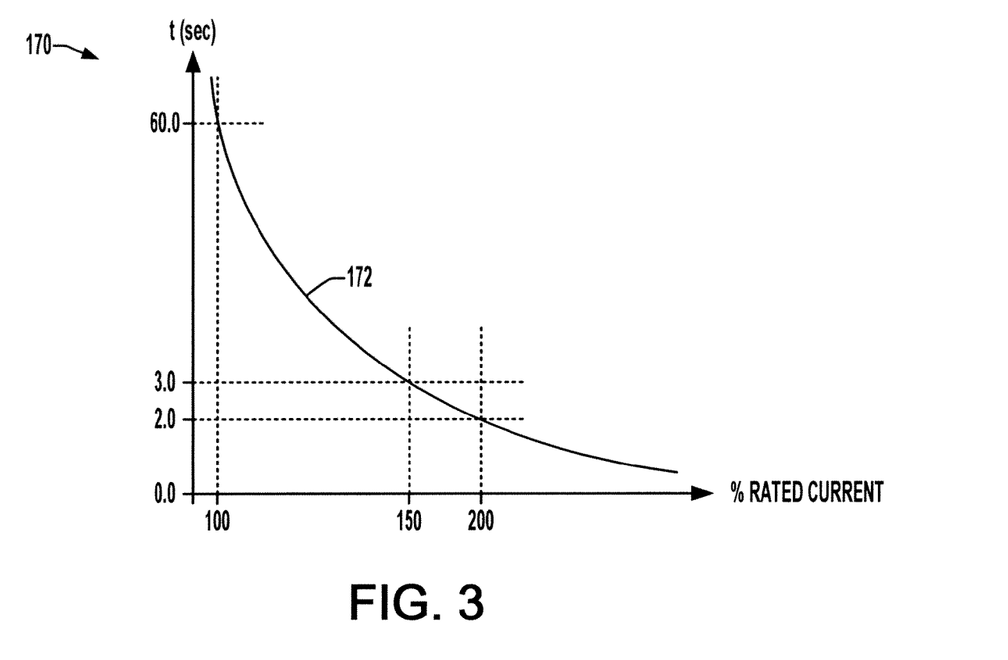
FIG. 3 is a graph illustrating an exemplary overload timetable curve for inverse time protection against overload conditions in the system of FIG. 1.

Referring also to FIG. 3, the overload protection component 170 in certain embodiments implements an inverse time protection curve 172, which can be implemented as a parametric equation or equations, or as a lookup table with interpolation. The protection component 170 can be implemented in hardware, processor-executed software, counters, etc., wherein the input signal or value 164 ($i_{det.out}$) provided by a peak detector with decay 160 is compared with the curve 172, and if the input signal or value 164 exceeds the curve 172, the output signal 174 is provided to enable the trip logic 140 in order to enter the protection mode to discontinue provision of the rectifier switching control signals 102 to the switching devices S1-S6. Otherwise, if the input signal or value 164 does not exceed the curve 172, the trip logic 140 remains in the first state for normal pulse width modulation operation of the active rectifier 10. In the illustrated example, the curve 172 is constructed such that an inverse time/magnitude relationship is provided, in which the output signal 174 will trigger the trip logic 140 to enter the protection mode based on the magnitude and duration of an overload. In particular, the larger the overload current amount (e.g., magnitude), the shorter time period that will elapse before the active rectifier 10 is turned off. Once the overload protection component 170 disables the trip logic 140 via signal 174 (e.g., after an overload condition ends), the trip logic component 140 may return to normal operation either right away or after a predetermined period of time.

The overload protection component 170 in one implementation can be an overload timetable implemented as a lookup table including a series of numbers representing percentages of rated current indexed vs. a corresponding time value. In the embodiment of FIG. 3, the curve 172 provides for tolerating 100% of rated current for 60 seconds, 150% of rated current for 3 seconds, and 200% of rated current for 2 seconds, although this is merely an example and any suitable curve 172 can be used by which overload conditions in the active rectifier 10 and the switches S1-S6 thereof are avoided and/or mitigated. In another possible implementation, the overload protection curve 172 may be implemented as a counter with an adjustable count speed that depends upon the amount of overload (e.g., depends upon the magnitude of the input signal 164). In this implementation, the overload counter counts faster for higher input signal or value magnitudes, and once a threshold count value has been reached (e.g., a preset trip count value), the overload protection component 170 outputs the trip signal or value 174 to activate the trip logic 140 to discontinue provision of gate pulses from the pulse generator 130 to the switching devices S1-S6.

As best seen in FIG. 1, in one embodiment, the controller 100 includes a quasi-RMS computation component 150 that receives the d and q-axis current feedback signals or values $i_{d.fbk}$ and $i_{q.fbk}$ from the stationary-to-synchronous converter 110, and computes an RMS value according to the equation $i_{det.in} = ((i_{d.fbk}^2 + i_{q.fbk}^2)/2)^{1/2}$ to provide an input signal or value $i_{det.in}$ 162 to a peak detector with decay 160. Thus the detector input signal or value $i_{det.in}$ 162 in normal operation is a DC signal or value when the phase currents $I_U$, $I_V$ and $I_W$ at the rectifier AC input are substantially balanced and free of noise spikes. However, the computation of the quasi-RMS component 150 accurately represents the real AC input RMS only when the phase currents $I_U$, $I_V$ and $I_W$ are substantially balanced. In this regard, the inventors have appreciated that as soon as the line-to-line AC input voltages and/or the AC input phase currents become unbalanced (e.g., due to power distribution system imbalance fault conditions and/or to the presence of electrical noise in the power distribution system (e.g., welding operations)), the d and q-axis currents (e.g., represented by the feedback signals or values $i_{d.fbk}$ and $i_{q.fbk}$) have significant second harmonic components (e.g., at 120 Hz for a 60 Hz AC power source 4), and the RMS current calculation of the component 150 becomes inaccurate.

Figure 4:
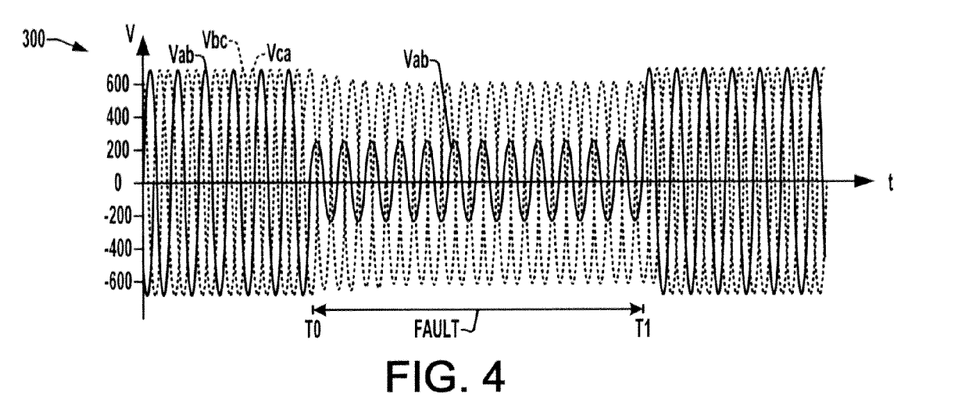
FIG. 4 is a graph illustrating rectifier input line-line voltages during normal and imbalance fault conditions in the system of FIG. 1.
Figure 5:
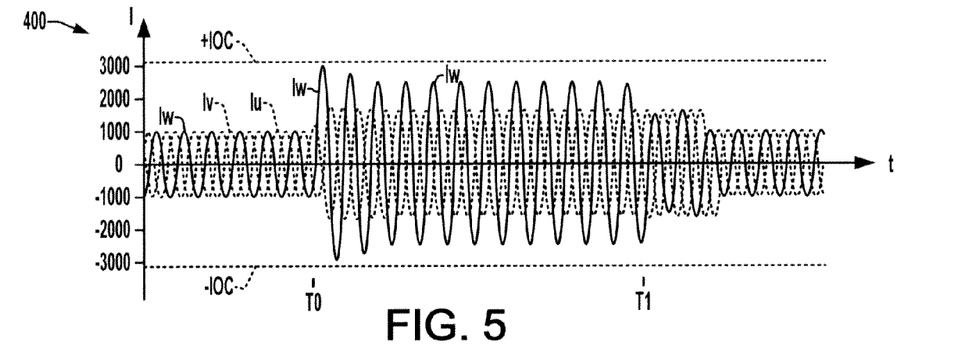
FIG. 5 is a graph illustrating exemplary phase currents at the active rectifier input in the system of FIG. 1 during normal and imbalance fault conditions.
Figure 6:
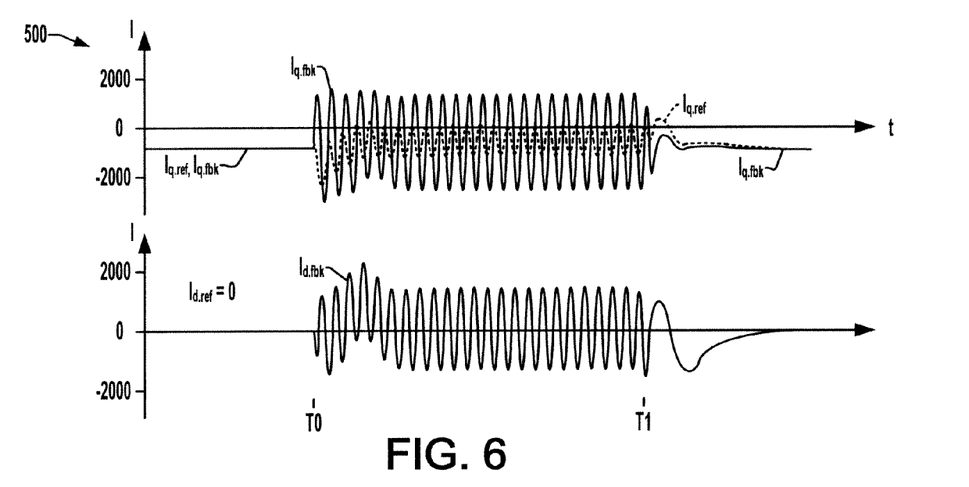
FIG. 6 is a graph illustrating synchronous frame d and q-axis feedback current curves in the system of FIG. 1 during normal and imbalance fault conditions.

Referring also to FIGS. 4-8, in such a condition, the second harmonic component will appear at the output 162 of the quasi-RMS computation component 150. FIG. 4 illustrates a graph 300 showing line-line voltages at the AC input terminals of the active rectifier 10 during normal operation and during an imbalance fault and/or noise condition between times T0 and T1. As seen in FIG. 4, in this example, the fault/noise condition from T0-T1 causes the line-line voltage Vab to decrease significantly in amplitude while the other line-line voltages Vbc and Vca decrease only slightly. FIG. 5 illustrates a graph 400 showing the corresponding phase currents $I_U$, $I_V$ and $I_W$ received at the active rectifier input during normal and fault conditions, where the magnitude of $I_W$ increases significantly during the fault period T0-T1, and the other phase currents $I_U$, $I_V$ also increase somewhat. FIG. 6 illustrates a graph 500 showing the synchronous frame d and q-axis feedback current signals or values $i_{d.fbk}$ and $i_{q.fbk}$ as well as the corresponding q-axis current reference signal or value $i_{q.ref}$ for the normal and fault conditions (where the d-axis reference current signal or value is set to 0 as is typical in motor drive operation). These current signals or values $i_{d.fbk}$, $i_{q.fbk}$ and $i_{q.ref}$ exhibit a second harmonic component during the fault/noise condition T0-T1 (e.g., 120 Hz).

Figure 7:
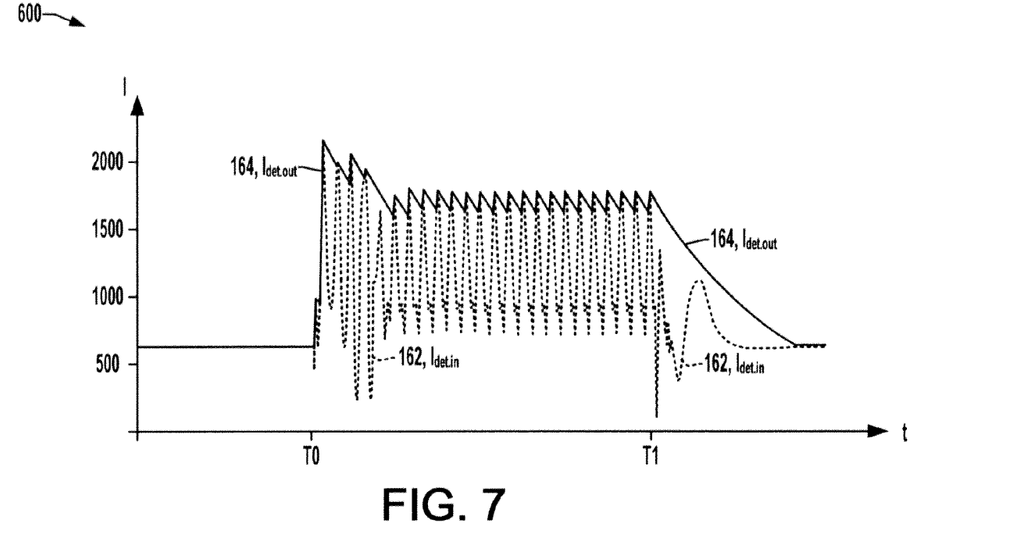
FIG. 7 is a graph illustrating exemplary peak detector input and output waveforms during normal and imbalance fault conditions in the system of FIG. 1.
Figure 8:
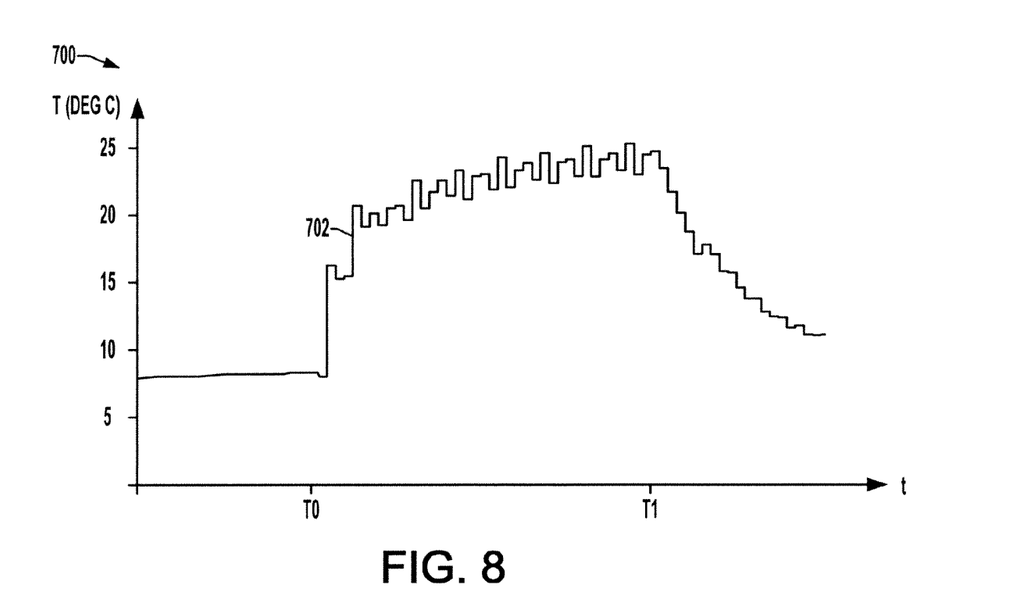
FIG. 8 is a graph illustrating temperature rise in an exemplary IGBT switching device in the active rectifier front end of the system of FIG. 1 during normal and imbalance fault conditions.

In this example, as noted above and as seen in FIG. 5, the fault condition at T0-T1 dramatically increases the amplitude of $I_W$, but this phase current does not reach the positive or negative overcurrent protection values (e.g., IOC level approximately +/−3200 A in this example), but still remains at a level that is potentially harmful to one or both of the IGBT switching devices S5 and S6 coupled to the corresponding rectifier input phase W. thus, even if the power conversion system 2 includes IOC shutdown circuitry (not shown), the condition shown in FIGS. 4-8 would not trigger such IOC circuitry. FIG. 8 provides a graph 700 illustrating an exemplary curve 702 showing an exemplary IGBT switching device temperature rise (e.g., for switching device S5 and/or S6 in FIG. 1), which rises from the beginning of the fault condition at T0 to the end of the fault at T1.

The provision of the peak detector with decay 160 receiving an input signal 162 ($i_{det.in}$) and providing an output signal 164 ($i_{det.out}$) to the overload protection component 170 operates to selectively discontinue the switching control signals 102 provided to the active rectifier 10 to prevent or reduce the likelihood of thermal damage to the switching devices S1-S6 of the active rectifier 10. It is noted that in the example of FIG. 1, the input signal or value 162 provided to the peak detector 160 is derived from measurements of the AC phase currents $I_U$, $I_V$ and $I_W$ received at the active rectifier input. Other embodiments are possible in which the peak detector input signal or value $i_{det.in}$ 162 is determined from one or more other parameters of the AC electrical input power from the source 4, such as voltage, power, current, and/or combinations thereof, etc.

Figure 2:
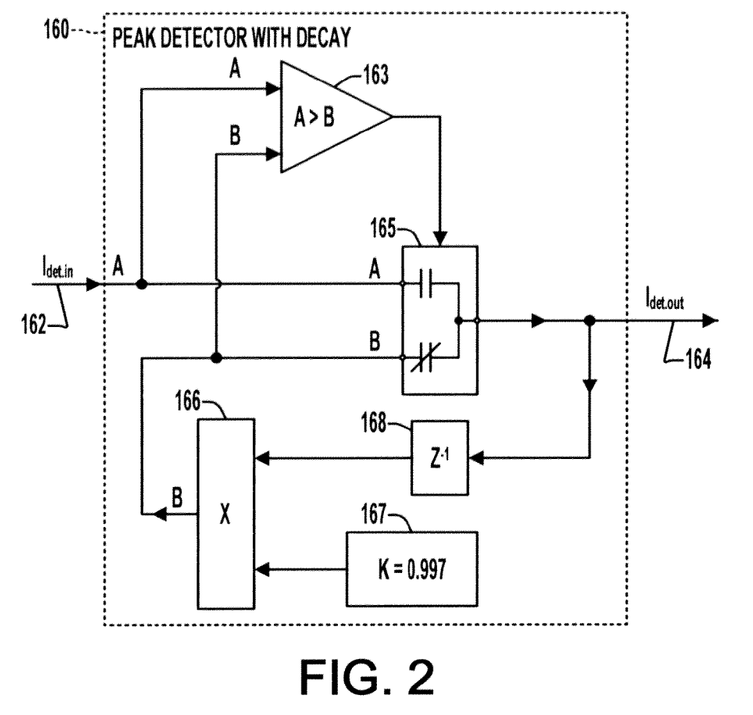
FIG. 2 is a schematic diagram illustrating an exemplary peak detector with decay in the power converter of FIG. 1.

Referring also to FIG. 2, the exemplary peak detector with decay 160 in the system 2 of FIG. 1 advantageously receives the input signal or value $i_{det.in}$ 162 and provides a detector output signal or value $i_{det.out}$ 164 to the overload protection component 170, where the signal or value $i_{det.out}$ 164 represents a peak value of the input signal or value $i_{det.in}$ 162 with a controlled decay determined according to at least one decay value 167. In this embodiment, moreover, the decay value 167 is adjustable, and may be stored as a variable or parameter in an electronic memory of the converter 2 (not shown). In this manner, situations like that of FIG. 5 in which one or more of the phase currents $I_U$, $I_V$ and $I_W$ received at the input to the active rectifier 10 are at high levels without exceeding the positive or negative IOC values can be detected to initiate activation of the trip logic 140 by the output signal 174 of the overload protection component 170 before damage or degradation to the switching devices S1-S6 occurs.

FIG. 7 shows a graph 600 illustrating operation of the peak detector and decay component 160 during normal and fault conditions in the system 2 of FIG. 1. As seen in this figure, the detector input signal or value $i_{det.in}$ 162 (calculated by the quasi-RMS computation component 150) exhibits a significant second order component (e.g., 120 Hz) beginning at time T0. It is noted in this regard, that directly providing this signal or value 162 as an input to the overload protection component 170 in the illustrated condition might not trigger the trip logic 140, since each rise in the signal 162 is quickly followed by a significant drop. As seen in FIG. 7, however, the provision of the decay in the peak detector component 160 causes the detector output signal or value $i_{det.out}$ 164 to rise quickly (tracking upward rises in the input signal 162) but to decrease at a controlled downward slope determined by a decay value 167 of the peak detector with decay component 160.

In the embodiment of FIG. 2, the peak detector 160 includes various components that can be implemented in hardware, processor-executed software, processor-executed firmware, logic, etc., and/or combinations thereof. Any suitable peak detector with decay 160 can be used by which a controlled output decay or downward slope is implemented along with the ability to substantially and/or quickly track upward rises in the input signal 162. A comparator 163 is included, having two inputs, one of which is provided with the detector input signal $i_{det.in}$ 162 ("A"), and an output of the comparator 163 is used as a control signal for a multiplexer 165 which also has one input (A) coupled to the detector input signal $i_{det.in}$ 162. The output of the multiplexer 165 provides the detector output signal 164 as an input to the overload protection component 170. The peak detector 160 also includes a delay operator 168, in one example operating to delay the output signal or value 164 by one sample period of the pulse width modulation (e.g., 4 kHz PWM frequency in one example), where the delay operator 168 provides a delayed output signal or value as an input to a multiplier 166. The peak detector 160 further includes an adjustable decay value 167 (e.g., K is less than unity, and equals 0.997 in one example) supplied as a second input to the multiplier 166. The multiplier 166 provides an output ("B") that is effectively a delayed detector output signal or value 164 scaled by the decay value 167. The delayed & scaled detector output signal B is then provided as a second input to the comparator 163 and also as a second input to the multiplexer 165. In operation, as seen in the graph 600 of FIG. 7, therefore, the detector output 164 essentially tracks the detector input 162 during rises thereof, and when the detector input 162 drops off rapidly (e.g., on the downward slope of each of the second harmonic cycle in this example), the detector output 164 will drop off much slower, where the downward slope of the detector output signal 164 is essentially set by the adjustable decay value 167 in the illustrated embodiment.

Figure 9:
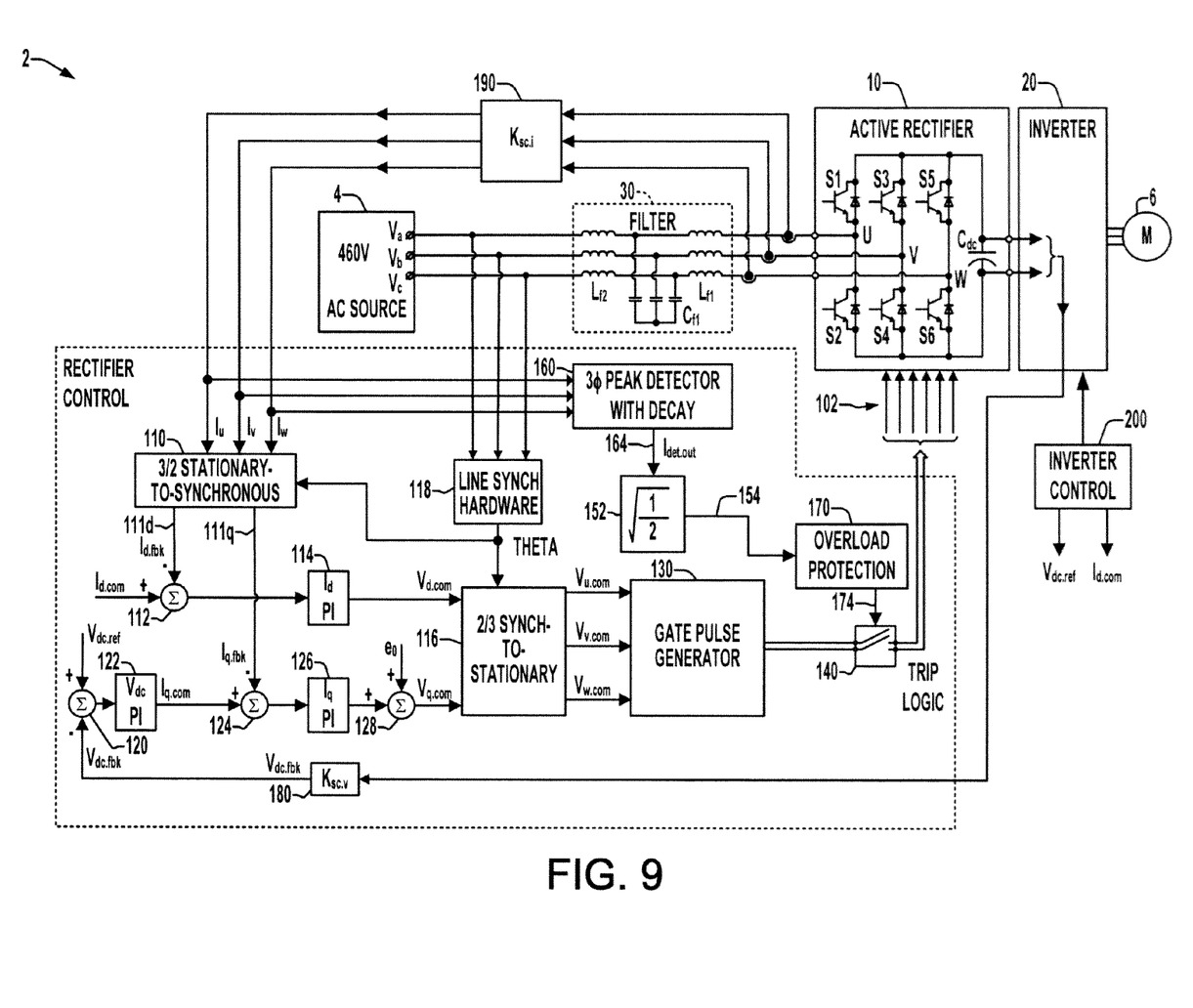
FIG. 9 is a schematic diagram illustrating another exemplary power conversion system with overload protection using a three-phase peak detector with decay in accordance with the present disclosure.

Referring also to FIGS. 9-11, another exemplary power conversion system embodiment is shown in FIG. 9, in which overload protection is provided using a three-phase peak detector with decay 160 operating in the stationary reference frame according to the AC phase current signals or values 162U, 162V and 162W ($I_U$, $I_V$ and $I_W$) received at the active rectifier input. In this example, the peak detector 160 provides the output signal or value 164 representing a peak value of the plurality of input signals or values $I_U$, $I_V$ and $I_W$ with a controlled decay determined according to one or more decay values 167. This signal 164 may be provided to the overload protection component 170 directly, or a computation component 152 can be provided in certain embodiments to divide the output signal or value 164 from the peak detector 160 by the square root of two, and the resulting signal or value 154 is provided as the input to the overload protection component 170. The use of the computation component 152 effectively creates an RMS representation of the detected peak with decay upon which the overload protection component 170 operates to selectively engage the trip logic 140 to selectively discontinue or allow provision of the gate pulses generated by the component 130 as switching control signals 102 to the switching devices S1-S6 of the active rectifier 10.

Figure 10:
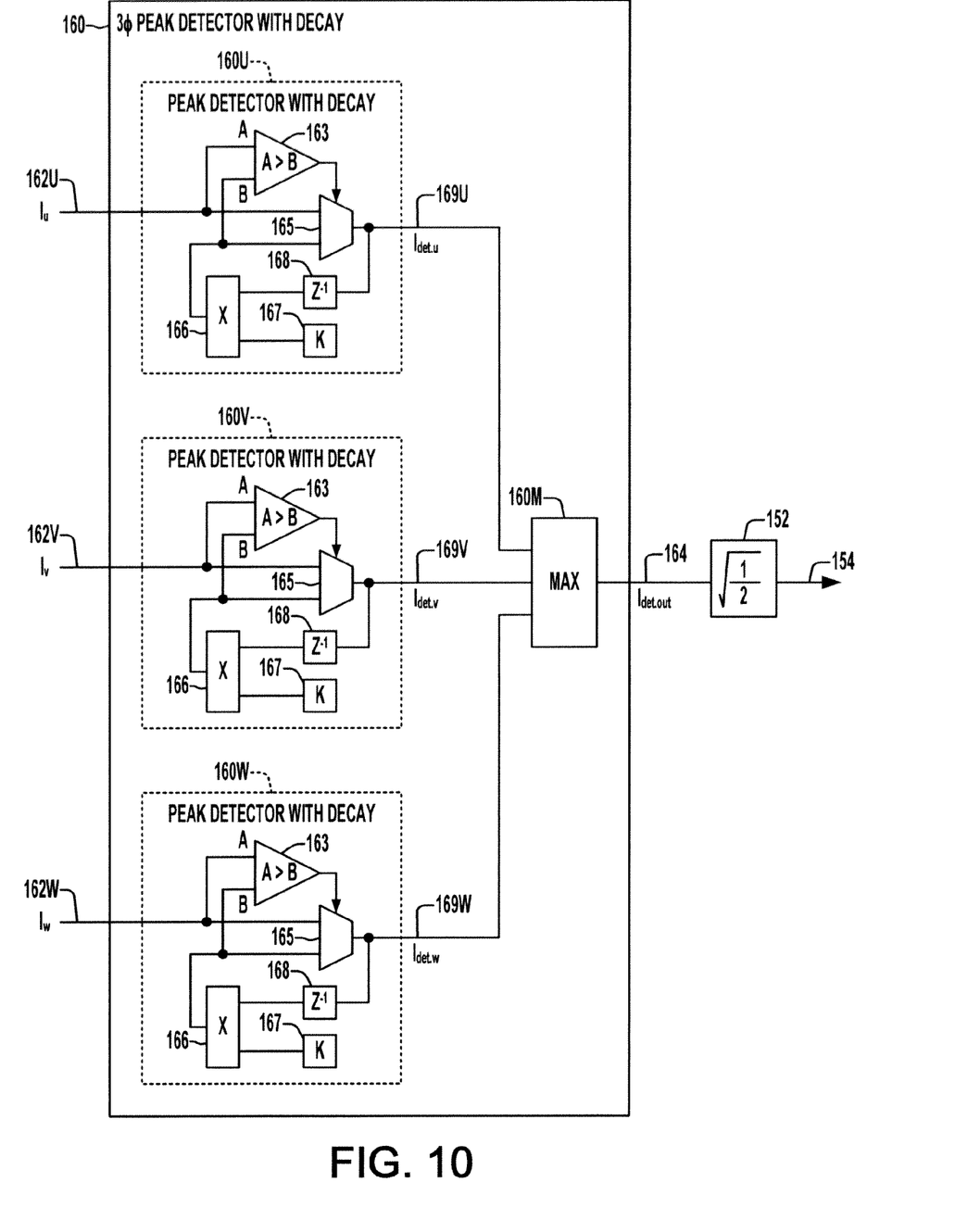
FIG. 10 is a schematic diagram illustrating an exemplary three-phase peak detector with decay in the system of FIG. 9.

FIG. 10 illustrates one embodiment of a three-phase peak detector with decay 160 in the system 2 of FIG. 9. In this example, the peak detector 160 includes three individual peak detector components 160U, 160V and 160W individually receiving a corresponding one of the AC phase current signals or values 162U, 162V and 162W ($I_U$, $I_V$ and $I_W$), respectively. The individual peak detector components 160U, 160V and 160W in this example include a comparator 163, a multiplexer 165, a delay component 168 and a multiplier component 166 similar to the peak detector with decay 160 illustrated and described above in connection with FIG. 2, and each includes an adjustable decay value 167, where these decay values 167 may be separately or jointly adjustable in certain embodiments, and may (but need not) be the same. The peak detector with decay 160 in FIG. 10, moreover, includes a maximum selector circuit 160M that receives the individual detector component signals or values 169U, 169V and 169W (e.g., $i_{det.u}$, $i_{det.v}$ and $i_{det.w}$) and provides the detector output signal or value 164 ($i_{det\ out}$) as a maximum one of the individual peak detector component output signals or values 169U, 169V and 169W. As discussed above, this output signal or value 164 in certain embodiments is then divided by the square root of 2 by the competition component 152 in order to provide an input signal 154 to the overload protection component 170.

Figure 11:
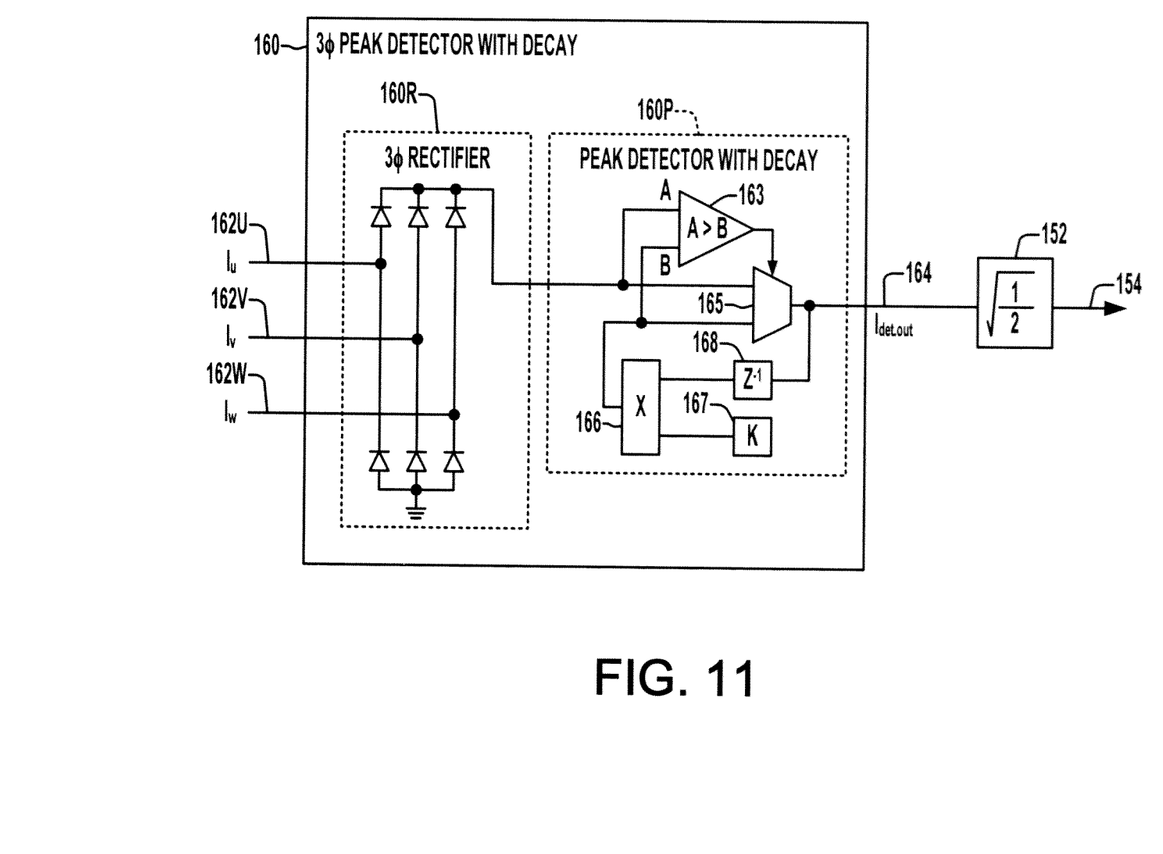
FIG. 11 is a schematic diagram illustrating another exemplary three-phase peak detector with decay in the system of FIG. 9.

FIG. 11 illustrates another three-phase peak detector with decay embodiment 160 in the system 2 of FIG. 9, in which a rectifier 160R receives the AC phase current signals or values 162U, 162V and 162W ($I_U$, $I_V$ and $I_W$) and provides a rectified output as an input to a single peak detector with decay component 160P, where the rectifier 160R may be an actual hardware rectifier having three pairs of diodes, and/or may be a logical rectifier providing a rectified output value representative of rectification of the input signals or values 162U, 162V and 162W. The peak detector with decay component 160P in this embodiment includes a comparator 163, a multiplexer 165, a delay component 168, a multiplier component 166 and an adjustable decay value 167 as described above. In the embodiments of FIGS. 10 and 11, a higher decay value (e.g., 0.9999 in one example) may be used to provide adequate proactive protection for the rectifier switching devices S1-S6 since the comparator input signals or values 162U, 162V and 162W ($I_U$, $I_V$ and $I_W$) are representative of a 60 Hz multiphase waveform rather than on a second harmonic (e.g., 120 Hz) signal as in the example of FIGS. 1 and 2 above.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, logic, or combinations thereof, which performs the specified function of the described component (i.e., that is functionally equivalent), even though not structurally equivalent to the disclosed structure which performs the function in the illustrated implementations of the disclosure. Moreover, the various control components may be implemented as computer-executable instructions for carrying out one or more of the above illustrated and described control operations, steps, tasks, where the instructions are included in a non-transitory computer-readable medium. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
an active rectifier, comprising an AC input having a plurality of AC input nodes to receive multiphase AC electrical input power, a DC output having first and second DC output nodes, and a plurality of rectifier switching devices individually coupled between one of the AC input nodes and one of the DC output nodes, the rectifier switching devices individually operable to selectively couple the AC input node with the corresponding DC output node according to a corresponding rectifier switching control signal;
a controller operative to generate rectifier switching control signals for selectively operating the rectifier switching devices to convert AC electrical input power to provide DC electrical power at the DC output;
a peak detector with at least one decay value, the peak detector receiving at least one input signal or value derived from the multiphase AC electrical input power and providing an output signal or value representing a peak value of the at least one input signal or value with a controlled decay determined according to the at least one decay value; and
an overload protection component operative to selectively discontinue provision of the rectifier switching control signals to the rectifier switching devices based at least partially on the output signal or value from the peak detector.

2. The power conversion system of claim 1, wherein the at least one decay value is adjustable.

3. The power conversion system of claim 2, wherein the at least one input signal or value is derived from measurements of AC phase currents of the multiphase AC electrical input power.

4. The power conversion system of claim 3, wherein the peak detector receives a plurality of input signals or values representing the measured stationary frame AC phase currents of the multiphase AC electrical input power, and wherein the peak detector provides the output signal or value representing a peak value of the plurality of input signals or values with a controlled decay determined according to the at least one decay value.

5. The power conversion system of claim 1, wherein the at least one input signal or value is derived from measurements of AC phase currents of the multiphase AC electrical input power.

6. The power conversion system of claim 5, wherein the peak detector receives a plurality of input signals or values representing the measured stationary frame AC phase currents of the multiphase AC electrical input power, and wherein the peak detector provides the output signal or value representing a peak value of the plurality of input signals or values with a controlled decay determined according to the at least one decay value.

7. A power conversion system, comprising:
an active rectifier, comprising an AC input having a plurality of AC input nodes to receive multiphase AC electrical input power, a DC output having first and second DC output nodes, and a plurality of rectifier switching devices individually coupled between one of the AC input nodes and one of the DC output nodes, the rectifier switching devices individually operable to selectively couple the AC input node with the corresponding DC output node according to a corresponding rectifier switching control signal;
a controller operative to generate rectifier switching control signals for selectively operating the rectifier switching devices to convert AC electrical input power to provide DC electrical power at the DC output;
a peak detector with at least one decay value, the peak detector receiving at least one input signal or value derived from the multiphase AC electrical input power and providing an output signal or value representing a peak value of the at least one input signal or value with a controlled decay determined according to the at least one decay value, wherein the at least one input signal or value is derived from measurements of AC phase currents of the multiphase AC electrical input power;
an overload protection component operative to selectively discontinue provision of the rectifier switching control signals to the rectifier switching devices based at least partially on the output signal or value from the peak detector;
a stationary-to-synchronous frame conversion component receiving a plurality of AC phase current signals or values representing measured stationary frame AC phase currents of the multiphase AC electrical input power and providing at least one synchronous frame current signal or value based at least in part on the plurality of AC phase current values; and
an RMS computation component receiving the at least one synchronous frame current signal or value and providing the at least one input signal or value to the peak detector based on at least one computed RMS value of the at least one synchronous frame current signal or value.

8. The power conversion system of claim 7, wherein the peak detector includes:
a comparator including a first input receiving the at least one input signal or value, and an output;
a delay component receiving the output signal or value and providing a delay output signal or value representing the output signal or value of the peak detector delayed by one sample period;
a multiplier operative to multiply the delay output signal or value from the delay component by the at least one decay value; and
a multiplexer operative when an output signal or value of the comparator indicates that the at least one input signal or value of the peak detector is greater than an output of the multiplier to provide the output signal or value of the peak detector as the at least one input signal or value, and operative when the output signal or value of the comparator indicates that the at least one input signal or value of the peak detector is less than or equal to the output of the multiplier to provide the output signal or value of the peak detector as the output signal or value of the multiplier.

9. The power conversion system of claim 7, wherein the at least one decay value is adjustable.

10. A power conversion system, comprising:
an active rectifier, comprising an AC input having a plurality of AC input nodes to receive multiphase AC electrical input power, a DC output having first and second DC output nodes, and a plurality of rectifier switching devices individually coupled between one of the AC input nodes and one of the DC output nodes, the rectifier switching devices individually operable to selectively couple the AC input node with the corresponding DC output node according to a corresponding rectifier switching control signal;

a controller operative to generate rectifier switching control signals for selectively operating the rectifier switching devices to convert AC electrical input power to provide DC electrical power at the DC output;

a peak detector with at least one decay value, the peak detector receiving at least one input signal or value derived from the multiphase AC electrical input power and providing an output signal or value representing a peak value of the at least one input signal or value with a controlled decay determined according to the at least one decay value, wherein the at least one input signal or value is derived from measurements of AC phase currents of the multiphase AC electrical input power;

an overload protection component operative to selectively discontinue provision of the rectifier switching control signals to the rectifier switching devices based at least partially on the output signal or value from the peak detector;

wherein the peak detector receives a plurality of input signals or values representing the measured stationary frame AC phase currents of the multiphase AC electrical input power, and wherein the peak detector provides the output signal or value representing a peak value of the plurality of input signals or values with a controlled decay determined according to the at least one decay value; and a computation component operative to divide the output signal or value of the peak detector by the square root of 2 and to provide the resulting signal or value as an input to the overload protection component.

11. The power conversion system of claim 10, wherein the peak detector comprises a plurality of individual peak detector components, the individual peak detector components each including an adjustable decay value and receiving a corresponding one of the plurality of input signals or values.

12. The power conversion system of claim 11:
wherein each of the individual peak detector components includes:
a comparator including:
a first input receiving the corresponding one of the plurality of input signals or values, and
an output,
a delay component receiving an output signal or value of the individual peak detector component and providing a delay output signal or value representing the output signal or value of the individual peak detector component delayed by one sample period,
a multiplier operative to multiply the delay output signal or value from the delay component by the at least one decay value, and
a multiplexer operative when an output signal or value of the comparator indicates that the corresponding one of the plurality of input signals or values of the individual peak detector component is greater than an output of the multiplier to provide the output signal or value of the individual peak detector component as the corresponding one of the plurality of input signals or values, and operative when the output signal or value of the comparator indicates that the corresponding one of the plurality of input signals or values of the individual peak detector component is less than or equal to the output of the multiplier to provide the output signal or value of the individual peak detector component as the output signal or value of the multiplier; and wherein the peak detector further comprises a maximum selector circuit providing the output signal or value of the peak detector as a maximum one of the output signals or values of the individual peak detector components.

13. The power conversion system of claim 10, wherein the peak detector comprises a rectifier receiving the plurality of input signals or values representing the measured stationary frame AC phase currents of the multiphase AC electrical input power, and wherein the peak detector provides the output signal or value representing a peak value of a rectifier output signal or value with a controlled decay determined according to the at least one decay value.

14. The power conversion system of claim 13, wherein the peak detector includes:
a comparator including a first input receiving the rectifier output signal or value, and an output;
a delay component receiving the output signal or value and providing a delay output signal or value representing the output signal or value of the peak detector delayed by one sample period;
a multiplier operative to multiply the delay output signal or value from the delay component by the at least one decay value; and
a multiplexer operative when an output signal or value of the comparator indicates that the rectifier output signal or value is greater than an output of the multiplier to provide the output signal or value of the peak detector as the rectifier output signal or value, and operative when the output signal or value of the comparator indicates that the rectifier output signal or value is less than or equal to the output of the multiplier to provide the output signal or value of the peak detector as the output signal or value of the multiplier.

15. The power conversion system of claim 10, wherein the at least one decay value is adjustable.

16. A non-transitory computer readable medium having computer executable instructions for generating switching control signals to operate an active rectifier of a power conversion system, the non-transitory computer readable medium comprising instructions for:
generating rectifier switching control signals for selectively operating switching devices of the active rectifier to convert multiphase AC electrical input power to DC electrical power;
providing an output signal or value representing a peak value of at least one input signal or value derived from the multiphase AC electrical input power with a controlled decay determined according to at least one decay value; and
selectively discontinuing the rectifier switching control signals based at least partially on the output signal or value.

17. The non-transitory computer readable medium of claim 16, wherein the at least one decay value is adjustable.

18. The non-transitory computer readable medium of claim 16, wherein the at least one input signal or value is derived from measurements of AC phase currents of the multiphase AC electrical input power.

19. A controller for operating an active rectifier of a power conversion system, comprising:
at least one processor programmed to:

generate rectifier switching control signals for selectively operating switching devices of the active rectifier to convert multiphase AC electrical input power to DC electrical power;

provide an output signal or value representing a peak value of at least one input signal or value derived from the multiphase AC electrical input power with a controlled decay determined according to at least one decay value; and selectively discontinue the rectifier switching control signals based at least partially on the output signal or value.

20. The controller of claim 19, wherein the at least one decay value is adjustable.

21. The controller of claim 19, wherein the at least one input signal or value is derived from measurements of AC phase currents of the multiphase AC electrical input power.

22. The controller of claim 19, wherein the at least one processor receives a plurality of input signals or values representing the measured stationary frame AC phase currents of the multiphase AC electrical input power, and wherein the at least one processor provides the output signal or value representing a peak value of the plurality of input signals or values with a controlled decay determined according to the at least one decay value.

* * * * *